March 24, 1931.  C. HEUZE  1,797,659
APPARATUS COMPRISING A HEATED CHAMBER AND TRANSPORTING
ROLLERS, SUCH AS THE ANNEALING APPARATUS
Filed Sept. 9, 1929

Inventor
Charles Heuze
By Dorsey H Cole
ATTORNEYS

Patented Mar. 24, 1931

1,797,659

UNITED STATES PATENT OFFICE

CHARLES HEUZE, OF AUVELAIS, BELGIUM, ASSIGNOR, BY MESNE ASSIGNMENTS, TO THE AMERICAN BICHEROUX COMPANY, A CORPORATION OF DELAWARE

APPARATUS COMPRISING A HEATED CHAMBER AND TRANSPORTING ROLLERS, SUCH AS THE ANNEALING APPARATUS

Application filed September 9, 1929, Serial No. 391,250, and in Belgium September 15, 1928.

The invention has relation to apparatus used in the glass manufacture, metallurgical and other arts comprising a heated chamber and transporting rollers, and concerns specially the construction of such apparatus.

The invention has mainly for its object to provide for such an arrangement as to avoid the troubles in operation of the transporting rollers from the expansions of the walls of the apparatus.

It is known that in the apparatus of the kind aforesaid, the transporting rollers are supported on bearings located outside the chamber and are generally secured to frames independent from the walls, the ends or the trunnions of the rollers passing through the said walls.

With annealing apparatus used in the glass manufacture, the temperatures of the heated chamber are maintained higher towards the entrance end, and at such end the transporting rollers are located in close relation to each other so as to avoid as far as possible the waves or corrugations in the glass not yet entirely solidified.

Under such circumstances, to provide for the passage of the ends or trunnions of the rollers through the walls of the apparatus, it has been the usual practice in the prior constructions to provide metallic boxes bearing on a lower portion of each wall, said metallic boxes being provided with openings allowing for the passage of the ends or trunnions of the rollers and the diameter of which is substantially that of the rollers or the trunnions thereof.

The metallic boxes thus form a supporting connection between the said lower portion and the upper portion of the wall, and it is found that whatever may be done to prevent the movements of said boxes, the latter are carried along owing to the expansions of the walls, with the result that frictional engagement occurs between the boxes and the rollers so that the correct operation of the latter is interfered.

The arrangement in accordance with the invention avoids entirely the above mentioned defects.

To this end the invention mainly consists in rendering the part of the wall through which the rollers or their trunnions pass, entirely independent from the lower and upper portions so that the free expansions of the latter may take place without any detrimental effect on the operation of the rollers.

The invention also consists, among the features insuring the independence of a portion of the traversed wall, in providing for the suspension of the upper portion of such wall, said suspension being arranged so as to allow for the expansions of said portion.

The invention also consists in constructing the upper portion of the walls and the cover or arch of the apparatus so that they are better adapted to the requirements than those heretofore proposed.

The invention further consists in providing, in the independent portion traversed by the rollers or the trunnions thereof, of means for closing the spaces between these rollers or the trunnions thereof, and in order that the invention may be clearly understood it will now be described in reference to the annexed drawings illustrating, by way of example, a preferred construction of annealing apparatus in accordance with the invention.

Figure 1:
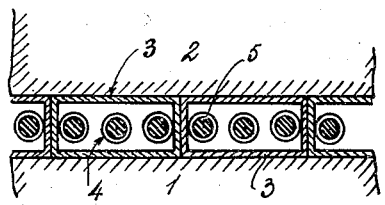
Fig. 1 shows diagrammatically a fragment of a prior construction.

Referring to Fig. 1, and as above explained, assuming 1 represents the lower portion of a side wall of an annealing apparatus and 2 the upper portion of said wall, in the prior constructions said upper portion is supported on the lower portion 1 through the intermediary of metallic boxes 3 each having one or several apertures or openings 4 formed therethrough for the passage of the trunnions 5 of the transporting rollers.

Under such constructional conditions, the free expansions of the portions 1 and 2 are not permitted without carrying with them the boxes 3, and as on the other hand the trunnions 5 are inserted at the outside of the wall in fixed bearings, friction or even jamming will take place at the passage openings 4 of the trunnions 5.

Further it is clear from the figures of the drawings, that the minimum distance between the trunnions 5 is limited by the thickness of the walls of the boxes, and as the minimum diameter of the trunnions 5 is also limited by the strength and stiffness of the transporting rollers, it will be seen that in the part of the apparatus at which the distance between the rollers is to be made as small as possible, the minimum of such distance is also limited.

Figure 2:
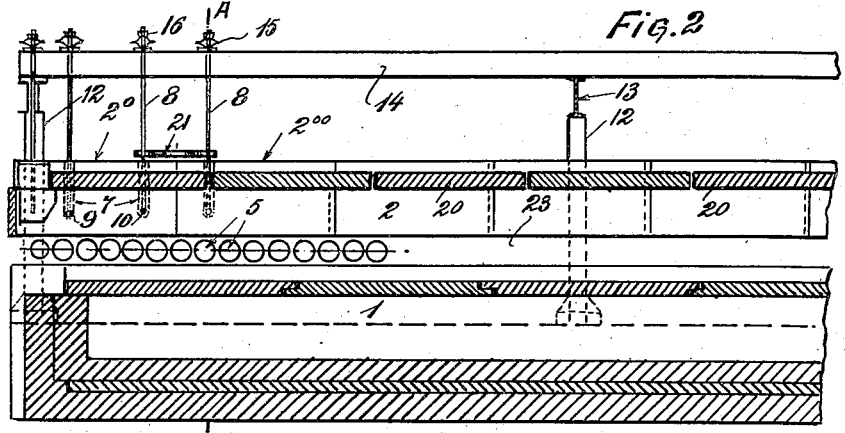
Fig. 2 is a side elevation of an annealing apparatus in accordance with the invention.
Figure 3:
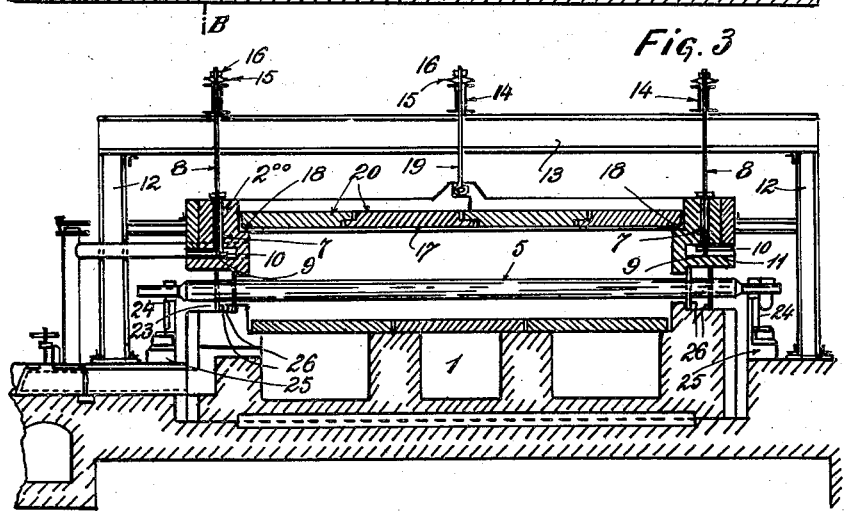
Fig. 3 is a vertical sectional view through A—B Fig. 2.
Figure 4:
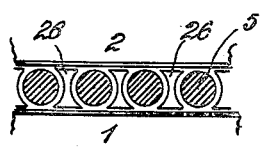
Fig. 4 shows, at an enlarged scale, a detail of the manner of closing the spaces between the rolls.

Referring now to Figures 2 and 3, and in accordance with the invention, the lower portion 1 of each of the side walls traversed by the rollers or the trunnions 5 thereof, is constructed in the usual manner, but the upper portion 2 of said wall is suspended.

To this end said portion 2 is formed by series of blocks $2°$, $2^{°°}$ ... etc., made of suitable refractory material, including if necessary a metallic structure, and each provided with one or a series of vertical passages 7 adapted to receive rods 8 secured in the blocks in any suitable way, but preferably removable, as for example by means of an eye 9 provided at the end of each rod and adapted to receive a pin 10 inserted through a transverse passage 11 as illustrated.

On the other hand, a frame or structure is formed comprising posts 12 supporting cross beams 13 which in turn support longitudinal beams 14 formed of two adjacent U shaped irons.

A beam such as 14 is provided above each portion marked 2; the rods 8 are engaged between the U beams and retained in suitable position by means of washers 15, and nuts 16.

Together with the wall 2, there is suspended from the structure 12, 13, 14 the arch of the apparatus, which arch is formed of T shaped iron members 17 supported at the ends on the flanges 18 of the blocks $2°$, $2^{°°}$ ... etc., and towards the center by means of a rod 19 engaged and retained between the U members of a central beam 14.

Plates 20 which rest on the wings of the T members 17 form a cover for the apparatus.

Figure 5:
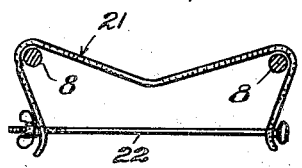
Fig. 5 shows, also at an enlarged scale, the connection between adjacent hangers 8.

To retain the blocks $2°$, $2^{°°}$ ... etc., in close relation in the longitudinal direction of the wall, suitable connecting means such as 21 (Fig. 5), which are preferably resilient and removable, may be used between adjacent suspending rods 8 of two blocks such as $2°$, means such as a bolt 22 being preferably provided to secure the connection.

The blocks $2°$, $2^{°°}$ ... etc. may conveniently comprise slopping joints or other interlocking means.

The assembly having been carefully executed as above described, an annealing apparatus is obtained in which the portions 1 and 2 of each wall may freely extend, leaving between them a portion 23 providing for the passage of the ends of the rollers or the trunnions thereof engaged in the bearings 24 secured to the lateral frames 25 of the apparatus.

In this manner, the operation of the rollers will not in any way be interfered with by the expansion of the portions 1 and 2 of the walls, and such rollers may further be arranged as closely as desired to each other, for example at the entrance end of the annealing apparatus, leaving between them space just sufficient for allowing the passage of the pieces of glass.

And to complete the arrangement, in the spaces left between the ends of the rollers or their trunnions and the opposite faces of the portions 1 and 2 of the walls, plates 26 are inserted between which plates and trunnions packings of asbestos may be placed.

It will be noted that amongst other advantages, the arrangement allows for the easy and quick replacing of one or other blocks such as $2°$, or one or other cover plate such as 20, as well as the easy inspection or replacing of one or several rollers.

The arrangement as described may be applied, as will be understood, to any portion of the reheating or annealing apparatus, but as in certain of such apparatus, for example the annealing apparatus used in the glass manufacture, certain portions are at comparatively low temperatures and consequently liable to very small expansions, while at the same time the rollers of said portions may be disposed at larger distances from one another, an arrangement may be adopted if desired, comprising in combination the arrangement in accordance with the invention in the most heated portions and the usual arrangement with interposed boxes in the portions of low or relatively low temperatures.

As will be understood, the invention is not limited, as regards the arrangement and applications to the particular example described and illustrated but may also be applied to similar apparatus and includes the alternatives based on the same principles of construction.

Claims:

1. A glass annealing apparatus having a heated chamber, walls and supporting rollers, including parts of said rollers passing through said walls, said walls constructed with a lower portion, an intermediate independent portion with means enabling parts of the rollers to pass through, an upper suspended portion and means to support said portion.

2. A glass annealing apparatus according to claim 1, in which the upper portion of each wall through which parts of the rollers are adapted to pass, is formed with adjacent blocks, suspended by adjustable rods from longitudinal members of the structure, such blocks also serving as an end bearing for the cover or arch of the apparatus.

3. A glass annealing apparatus according to claim 1, comprising a supporting structure and an arch including metallic members and suspended at least by the central part thereof from the supporting structure.

4. A glass annealing apparatus according to claim 1, in which the upper portion of each wall through which parts of the rollers are adapted to pass, is formed with adjacent blocks, suspended by adjustable rods from appropriate members of the supporting structure, and such blacks are maintained adjacent to each other by means of connecting members engaging the suspension rods of adjacent blocks.

5. A glass annealing apparatus according to claim 1, in which the free spaces left between the parts of the rollers passing through the walls, and the opposite faces of the lower and upper portions of said walls are filled in with a packing of asbestos or any other suitable material.

6. In an annealing furnace, having its lower side walls supported from below, and its upper side walls supported from above independently of the lower portions thereof, an intermediate side section, and rollers, portions of which project through the intermediate section.

7. An annealing furnace having the upper and lower portions of its side walls supportedly independently of each other, an intermediate side portion intermediate of the upper and lower portions, and rollers, portions of which project through the intermediate portion and position the same.

In testimony whereof I affix my signature.

CHARLES HEUZE.